United States Patent Office 3,356,668
Patented Dec. 5, 1967

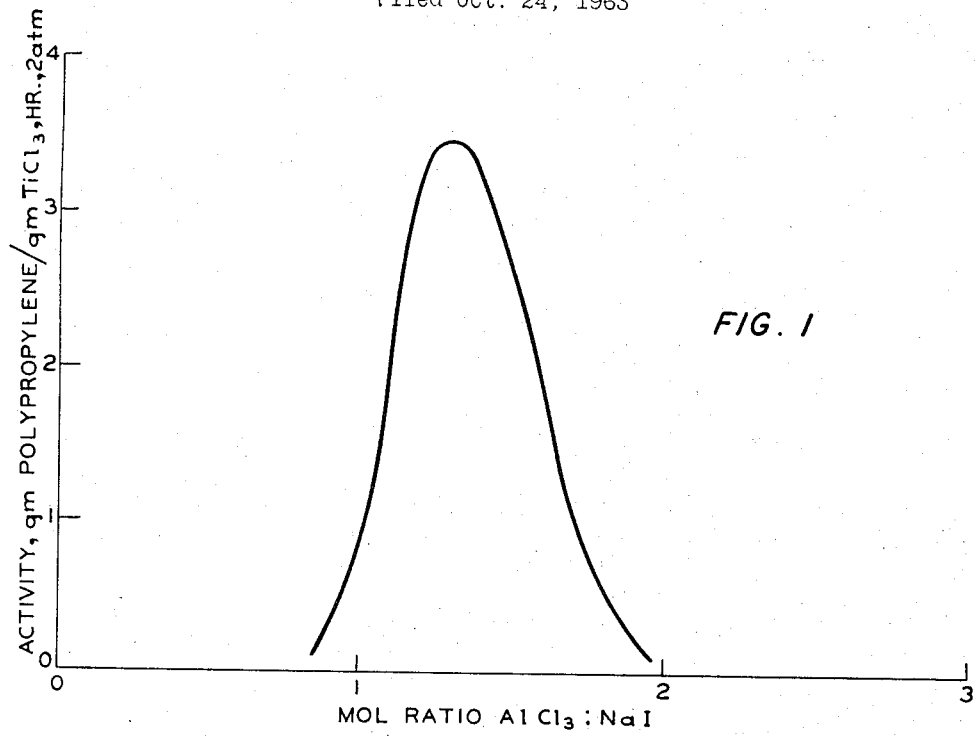
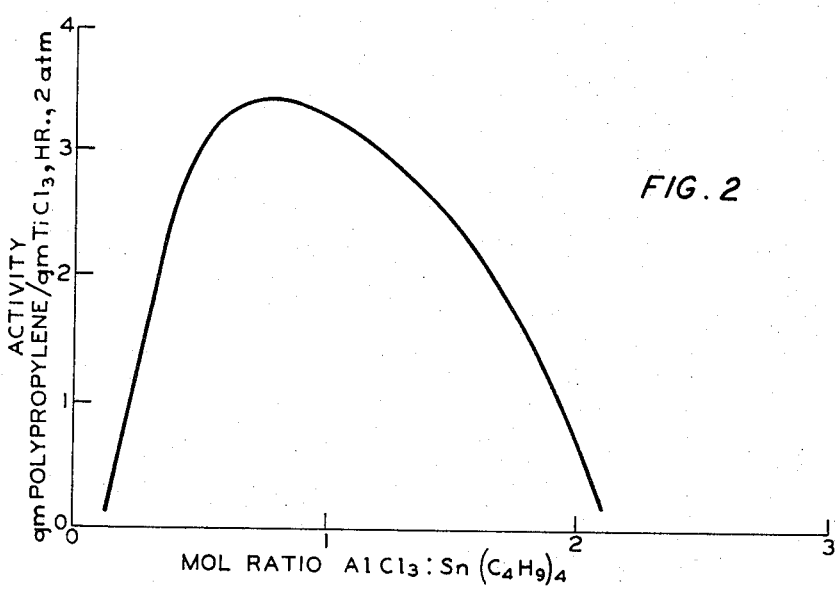

3,356,668
PROCESS AND CATALYST FOR THE
POLYMERIZATION OF OLEFINS
Pierre Dassesse, Uccle, Brussels, and Roger Dechenne, Strombeek, Belgium, assignors to Solvay & Cie., Societe en commandite, a simple of the Kingdom of Belgium
Filed Oct. 24, 1963, Ser. No. 318,594
Claims priority, application Netherlands, Jan. 10, 1963, 287,653
11 Claims. (Cl. 260—93.7)

This invention relates to a pryocess for the polymerization of olefins, especially ethylene and propylene, and to improved catalysts for such polymerization.

It is known to polymerize and copolymerize olefins (e.g. at 50° to 100° C. and from 1 to 30 atmospheres, abs.) in the presence of a ternary catalyst which forms on mixing the following:

(a) A metal, hydride or an organometal compound of a metal from the fourth, fifth and sixth groups of the Periodic Table [1];

(b) An inorganic compound of a polyvalent metal having at least three valencies; and (c) A halide of an element of the third or the fifth group of the Periodic Table (Belgian Patent 547,618).

Ingredients (a) include the tetraalkyls and tetraaryls of tin and of lead, especially those containing up to 40 carbon atoms per molecule, e.g., tetraethyl lead, tetrapropyl lead, tetrabutyl lead, tetraphenyl lead, tetranaphthyl lead, and the corresponding compounds of tin. The tin tetraalkyls produce especially active catalysts.

Ingredients (b) include the mineral acid salts of titanium, vanadium, chromium, molybdenum, and tungsten, the halides of titanium being frequently used.

Ingredients (c) include the halides of aluminum, of antimony, and of boron. Especially suitable are aluminum trichloride, antimony pentachloride, and boron trifluoride.

It has been proposed, for the manufacture of highly crystalline polypropylene having a high content of material insoluble in boiling heptane, to utilize a quaternary catalyst, three ingredients of which are those of the ternary catalysts defined hereinbefore and the fourth ingredient of which is an amine or a quaternary ammonium salt (Belgian Patent 624,645).

The present invention effects a novel improvement in processes utilizing the ternary catalyst systems, particularly in their application to the polymerization of propylene.

An object of this invention is to provide an improved polymerization catalyst. Another object of the invention is to provide an improved process for the polymerization of aliphatic 1-olefins. A further object of the invention is to increase yields of crystalline, heptane-insoluble polymers of olefins, such as propylene. Other objects and advantages will become apparent to those skilled in the art upon reading this disclosure.

The improvement in accordance with this invention comprises polymerizing olefins in the presence of a quaternary catalyst which forms on mixing the following:

(a) A metal hydride or an organometal compound of a metal chosen from those of the fourth, fifth, and sixth groups of the Periodic Table;

(b) An inorganic compound of a polyvalent metal having at least three valencies;

(c) A halide of an element chosen from the third or the fifth group of the Periodic Table; and (d) An alkali-metal iodide or ammonium iodide.

In the drawings, FIGURE 1 is a curve showing the relationship between the molar ratio of aluminum chloride to soduim iodide and the activity of a quaternary

[1] Lange, N. A., "Handbook of Chemistry," 4th ed., 1941, Sandusky, Ohio, Handbook Publishers, Inc., pages 18 and 19.

catalyst, in accordance with this invention, prepared from aluminum chloride and sodium iodide (together with other ingredients).

FIGURE 2 is a curve showing the relationship between the activity of a quaternary catalyst according to this invention and the mol ratio of aluminum chloride to tin tetra-normal-butyl utilized to form this catalyst.

The improvements effected by the process according to this invention are particularly interesting in the case of propylene polymerization, although the process can also be utilized in the polymerization of ethyelne and of α olefins containing more than three carbon atoms per molecule. When the ternary catalyst is utilized for the polymerization of propylene, one obtains relatively small yields of crystalline polypropylene. The formation of oils and greases of low molecular weight is also observed. The quaternary catalyst, on the contrary, permits one to obtain polypropylene having very high molecular weight a content of material insoluble in boiling heptane greater than 95 weight percent and crystallinity, determined with X-rays, as high as 62 weight percent.

While all of the iodides of the alkali metals and ammonium iodide can be used, they are not all equally effective. The following order of decreasing activity is noted:

$$NaI > KI > NH_4I$$

A small quantity of one of the iodides is sufficient to produce significant effects. However, in practice, one adds amounts of iodide such that the molar ratio of ingredient (c) to ingredient (d) (supra) in the quaternary catalyst is within the range 0.7:1 to 2:1, preferably about 1.3:1. It has been established that the activity of the quaternary catalyst varies markedly as a function of the molar ratio (c) to (d) and that it attains a marked maximum when this ratio is approximately 1.3:1. The curve showing the activity of a quaternary catalyst as a function of the molar ratio (c):(d) appears in FIGURE 1. It has also been found that the optimum value of the ratio of (c) to (d) does not depend on the relative amounts of the other catalyst ingredients and, particularly, that it is independent of the molar ratio of (a) to (c). This optimum value of 1.3.1 is characteristic of the catalyst system utilized. For a different catalyst, the well known ternary system, $TiCl_3/AlRCl_2/X$, it has been established that the optimum value is 2:1 when the third ingredient X is an amine, a quaternary ammonium salt or an alkali metal iodide. Tests have shown, on the other hand, that, although the molar ratio of (c) to (d) corresponding to the maximum activity of the quaternary catalyst system does not depend on the relative quantities of the other catalyst ingredients, such is not the case with the corresponding activity value. The curve showing the variation of the latter as a function of the molar ratio of (c) to (a) for a molar ratio of (c) to (d) equal to 1.3:1, is shown in FIGURE 2.

From these data, it is possible to deduce the relative molar composition of a quaternary catalyst system possessing a high activity:

Ingredients:
(a) ---------------------------------- 10–15
(b) ---------------------------------- 3–3.5
(c) ---------------------------------- 10
(d) ---------------------------------- 7.5

Ingredient (a), which should be chosen from among the metals, the hydrides and the organometal compounds of metals of the fourth, fifth and sixth groups of the Periodic Table, is preferably a tetraalkyl tin, for example, a tetrabutyltin.

Ingredient (b) is an inorganic compound of a polyvalent metal having at least three valencies, for example, titanium trichloride.

Ingredient (c) is advantageously chosen from among the halides of aluminum, particularly the chloride.

Regarding ingredient (d), the factors governing its choice have previously been discussed herein.

The polymerization of propylene in the presence of the quaternary catalyst according to this invention can be effected according to known techniques, viz.: in the absence of solvent, in solution in a hydrocarbon, or in suspension in a diluent. The last-mentioned material can be a hydrocarbon which is liquid and inert toward the catalyst under the polymerization conditions, or it can be the monomer itself maintained in the liquid state under saturation pressure.

The examples which follow, while not to be considered unduly limiting, are given to illustrate the present invention.

*Example I*

*Quaternary catalyst preparation.*—A solution of 29 grams of tetranormal-butyl tin and 7.5 grams of aluminum chloride in 100 cc. of benzene is heated at reflux for three hours. To 13 cc. of this solution is added 0.84 gram of sodium iodide, and the resulting mixture is agitated for one hour at 60° C. Then, 400 milligrams of titanium trichloride is added, and the resulting mixture is maintained at 60° C. for an additional 30 minutes.

*Polymerization of propylene.*—The suspension of catalyst prepared as hereinbefore described is introduced, out of contact with air, into a one-liter autoclave. After injection of 250 cc. of benzene and 167 grams of propylene, the mixture is heated at 60° C. for five hours. The resulting mixture is removed from the reactor, the unreacted monomer is allowed to escape, the polypropylene is filtered, washed with methanol and dried. There is thus obtained 50 grams of polypropylene whose crystalline content, based on X-ray diffraction, is 62 percent. The fraction insoluble in boiling heptane amounts to 95.6 weight percent.

*Example II*

The procedure of Example I is repeated, sodium iodide being replaced with other salts. The results of these runs are shown in Table I.

TABLE I

| Catalyst ingredient (d) | NaI | KI | NH$_4$I | I$_2$ | NaIO$_3$ | NaCl |
| --- | --- | --- | --- | --- | --- | --- |
| Polypropylene production, gm | 50 | 33 | 10 | 0 | 2 | 1.6 |
| Catalyst activity, gm. polypropylene/gm. TiCl$_3$. hr.2 atm | 3.45 | 2.9 | 0.8 | 0 | 0.16 | 0.12 |
| Polypropylene crystallinity, percent | 62 | 59 | | | | |
| Insoluble in boiling heptane, wt. percent | 95.6 | 97.3 | | | | |

It has been established that only the alkali metal iodides and ammonium iodide confer appreciable additional activity on the catalyst. The alkali metal chlorides are practically inactive, as are molecular iodine and the iodates.

*Example III*

Runs are made under the same conditions as in Example I, but with different proportions of the catalyst ingredients. The results of these runs are shown in Table II and in FIGURES 1 and 2.

TABLE II

| Mol Ratio AlCl$_3$/NaI | Mol Ratio AlCl$_3$/Sn(C$_4$H$_9$)$_4$ | Polypropylene Production, gm. | Catalyst Activity, gm. polypropylene/gm. TiCl$_3$.hr.2 atm. |
| --- | --- | --- | --- |
| 0.85 | 0.67 | 1.8 | 0.13 |
| 1.23 | 0.67 | 46.5 | 3.29 |
| 1.38 | 0.67 | 50.0 | 3.36 |
| 1.73 | 0.67 | 16.0 | 1.01 |
| 1.3 | 0.33 | 27.0 | 2.03 |
| 1.3 | 0.67 | 52.5 | 3.33 |
| 1.3 | 0.67 | 50.0 | 3.45 |
| 1.3 | 1.00 | 48.6 | 3.31 |
| 1.3 | 2.00 | 17.5 | 1.18 |

From the data above and from FIGURES 1 and 2, it is evident that catalysts of exceptionally high activity are obtained when the molar ratio of aluminum chloride to sodium iodide is in the range 1.2:1 to 1.7:1 and that of aluminum chloride to tetra-(n-butyl)-tin is in the range 0.3:1 to 2:1.

Similar results are obtainable by polymerizing ethylene, 1-butene, or 1-pentene with the catalysts in accordance with this invention. Copolymerization of two or more 1-olefins is also within the scope of the invention.

Variation and modification within the scope of the invention will be apparent to those skilled in this art. For example, inert liquid hydrocarbon diluents can be used in the polymerization reaction; or diluent can be omitted. The reaction can be conducted in gaseous or liquid phase. Polymerization temperature can range from 20° C. or lower to 200° C. or higher. Pressures can range from 0.1 to 500 atmospheres, absolute, or above, and reaction times from 10 minutes to 10 hours. Generally, aliphatic 1-olefins having up to 8 carbon atoms per molecule can be polymerized according to this invention.

We claim:

1. In a process for the polymerization of aliphatic 1-olefins in the presence of a catalyst obtained by commingling:
   (a) a material selected from the group consisting of tetraalkyl tin, tetraaryl tin, tetraalkyl lead, and tetraaryl lead, said material containing up to 40 carbon atoms per molecule;
   (b) a mineral acid salt of an element selected from the group consisting of titanium, vanadium, chromium, molybdenum, and tungsten; and
   (c) a halide of an element selected from the group consisting of aluminum, antimony, and boron;
the improvement which comprises adding to the mixture forming said catalyst at least one iodide of the class alkali-metal iodides, including ammonium iodide, the mol ratio of catalyst component (c) to said iodide being in the range of 1.2:1 to 1.7:1 and the mol ratio of catalyst component (c) to catalyst component (a) is in the range of 0.3:1 to 2:1.

2. A process which comprises polymerizing at least one olefin selected from the group consisting of ethylene and propylene in the presence of a catalyst which forms on commingling a titanium halide, a tin-tetraalkyl, an aluminum halides and an iodide selected from the group consisting of sodium iodide, potassium iodide, and ammonium iodide, wherein the mol ratio of said aluminum halide to said iodide is in the range of 1.2:1 to 1.7:1 and the mol ratio of said aluminum halide to said tin-tetraalkyl is in the range of 0.3:1 to 2:1.

3. A process which comprises polymerizing propylene to crystalline polymer in the presence of a catalyst which forms on commingling titanium trichloride, tetrabutyl tin, aluminum chloride and sodium iodide, wherein the mol radio of aluminum chloride to sodium iodide is in the range of 1.2:1 to 1.7:1 and the mol ratio of said aluminum chloride to said tetrabutyltin is in the range of 0.3:1 to 2:1.

4. A process according to claim 3 wherein the molar ratio of aluminum chloride to sodium iodide is within the range 1.2:1 to 1.7:1 and the molar ratio of aluminum chloride to tetrabutyl tin is within the range 0.3:1 to 2:1, the polymerization temperature is in the range 50 to 100° C., and the pressure is in the range 1 to 30 atmospheres.

5. A process which comprises polymerizing propylene to crystalline polymer in the presence of a catalyst which forms on commingling titanium trichloride, tetrabutyl tin, aluminum chloride and potassium iodide, wherein the mol ratio of aluminum chloride to potassium iodide is in the range of 1.2:1 to 1.7:1 and the mol ratio of said aluminum chloride to said tetrabutyl tin is in the range of 0.3:1 to 2:1.

6. A process which comprises polymerizing propylene to crystalline polymer in the presence of a catalyst which forms on commingling titanium trichloride, tetrabutyl tin, aluminum chloride and ammonium iodide, wherein the mol ratio of aluminum chloride to ammonium iodide is in the range of 1.2:1 to 1.7:1 and the mol ratio of said aluminum chloride to said tetrabutyl tin is in the range of 0.3:1 to 2:1.

7. An improved polymerization catalyst which forms on commingling
(a) a material selected from the group consisting of tetraalkyl tin, tetraaryl tin, tetraalkyl lead, and tetraaryl lead;
(b) a mineral acid salt of an element selected from the group consisting of titanium, vanadium, chromium, molybdenum, and tungsten;
(c) a halide of an element selected from the group consisting of halides of aluminum, antimony, and boron;
(d) at least one iodide, the mol ratio of catalyst component (c) to said iodide being in the range of 1.2:1 to 1.7:1 and the mol ratio of catalyst component (c) to catalyst component (a) is in the range of 0.3:1 to 2:1 of the class alkali-metal iodides, including ammonium iodide.

8. An improved polymerization catalyst which forms on commingling a tetraalkyl tin, a titanium halide, an aluminum halide and an iodide selected from the group consisting of sodium, potassium, and ammonium iodides, wherein the mol ratio of aluminum halide to iodide is in the range of 1.2:1 to 1.7:1 and the mol ratio of said aluminum halide to said tetraalkyl tin is in the range of 0.3:1 to 2:1.

9. A catalyst which forms on commingling tetrabutyl tin, titanium trichloride, aluminum chloride and an iodide selected from the group consisting of sodium, potassium, and ammonium iodides, wherein the mol ratio of aluminum chloride to said iodide is in the range of 1.2:1 to 1.7:1 and the mol ratio of said aluminum chloride to said tetrabutyl tin is in the range of 0.3:1 to 2:1.

10. A polymerization catalyst which forms on commingling tetrabutyl tin, titanium trichloride, aluminum chloride and sodium iodide, the molar ratio of aluminum chloride to sodium iodide being in the range 1.2:1 to 1.7:1 and the molar ratio of aluminum chloride to tetrabutyl tin 0.3:1 to 2:1.

11. An improved polymerization catalyst which forms on commingling from 10 to 15 molar proportions of tetrabutyl tin, from 3 to 3.5 molar proportions of titanium trichloride, 10 molar proportions of aluminum chloride and 7.5 molar proportions of sodium iodide.

References Cited

UNITED STATES PATENTS

| | | | |
|---|---|---|---|
| 3,189,585 | 6/1965 | Shearer | 260—93.7 |
| 3,277,069 | 10/1966 | Natta et al. | 260—93.7 |

FOREIGN PATENTS

| | | |
|---|---|---|
| 549,836 | 1/1957 | Belgium. |
| 624,645 | | Belgium. |
| 809,717 | 3/1959 | Great Britain. |
| 860,407 | 2/1961 | Great Britain. |

JOSEPH L. SCHOFER, *Primary Examiner.*

M. KURTZMAN, *Assistant Examiner.*

UNITED STATES PATENT OFFICE
CERTIFICATE OF CORRECTION

Patent No. 3,356,668                        December 5, 1967

Pierre Dassesse et al.

It is hereby certified that error appears in the above numbered patent requiring correction and that the said Letters Patent should read as corrected below.

Column 4, line 55, for "halides" read -- halide --; line 65, for "radio" read -- ratio --; column 5, line 27, beginning with "(d) at least one" strike out all to and including "ammonium iodide." in line 32, same column 5, and insert instead the following:

>(d) at least one iodide of the class alkali-metal iodides, including ammonium iodide, the mole ratio of catalyst component (c) to said iodide being in the range of 1.2:1 to 1.7:1 and the mol ratio of catalyst component (c) to catalyst component (a) is in the range of 0.3:1 to 2.1.

Signed and sealed this 11th day of March 1969.

(SEAL)
Attest:

EDWARD M. FLETCHER, JR.                 EDWARD J. BRENNER
Attesting Officer                       Commissioner of Patents